US009817740B2

(12) United States Patent
Johnson et al.

(10) Patent No.: US 9,817,740 B2
(45) Date of Patent: Nov. 14, 2017

(54) REMOTE MONITORING SYSTEM FOR HANDHELD ELECTRONIC DEVICES

(71) Applicant: Bretford Manufacturing, Inc., Franklin Park, IL (US)

(72) Inventors: David Johnson, San Francisco, CA (US); Hubert Benjamin Ki Durn Ng, Park Ridge (IL)

(73) Assignee: Bretford Manufacturing, Inc., Franklin Park, IL (US)

( * ) Notice: Subject to any disclaimer, the term of this patent is extended or adjusted under 35 U.S.C. 154(b) by 7 days.

(21) Appl. No.: 15/297,598

(22) Filed: Oct. 19, 2016

(65) Prior Publication Data

US 2017/0039122 A1   Feb. 9, 2017

Related U.S. Application Data

(63) Continuation of application No. 14/612,566, filed on Feb. 3, 2015, now Pat. No. 9,501,380.

(60) Provisional application No. 61/935,653, filed on Feb. 4, 2014.

(51) Int. Cl.
*G06F 11/30* (2006.01)
*G06F 11/34* (2006.01)
*G06F 11/32* (2006.01)

(52) U.S. Cl.
CPC ...... *G06F 11/3055* (2013.01); *G06F 11/3006* (2013.01); *G06F 11/3013* (2013.01); *G06F 11/3034* (2013.01); *G06F 11/3041* (2013.01); *G06F 11/3058* (2013.01); *G06F 11/3065* (2013.01); *G06F 11/324* (2013.01); *G06F 11/34* (2013.01); *G06F 11/325* (2013.01)

(58) Field of Classification Search
None
See application file for complete search history.

(56) References Cited

U.S. PATENT DOCUMENTS 8,188,714 B2 * 5/2012 Petrick .................. G06F 1/1628
320/107
9,130,385 B2   9/2015 Chen
9,330,520 B2   5/2016 Phelps et al.
(Continued)

OTHER PUBLICATIONS

G. Shultz, *Map and Troubleshoot your USB ports with Microsoft USB View*, TechRepublic Blog, Apr. 12, 2012 (7 pages).
(Continued)

*Primary Examiner* — Idriss N Alrobaye
*Assistant Examiner* — Dayton Lewis-Taylor
(74) *Attorney, Agent, or Firm* — Anderson Gorecki LLP

(57) ABSTRACT

A remote monitoring system for handheld electronic devices includes a multi-port hub, and a port visualizer connected to one of the ports of the multi-port hub. The port visualizer is configured to provide a host with mapping information correlating USB hub ports with physical storage bays within the storage system. A USB controller monitors the charge status of the ports and reports the charge status information both locally and to a HED status application. The port visualizer obtains device status information from the host and reports device status information to the HED status application. A client application obtains charge status information and device status information from the HED status application to enable remote monitoring of devices connected to the storage system.

15 Claims, 8 Drawing Sheets

(56) References Cited

U.S. PATENT DOCUMENTS

| | | |
|---|---|---|
| 2003/0088727 A1 | 5/2003 | Zarns |
| 2004/0133667 A1* | 7/2004 | Chen .................. H04L 12/2602 709/223 |
| 2009/0096336 A1* | 4/2009 | Petrick ................ G06F 13/4022 312/237 |
| 2011/0035525 A1* | 2/2011 | Petrick ................ G06F 13/4022 710/304 |
| 2011/0084666 A1* | 4/2011 | Dandekar ............. H02J 7/0021 320/137 |
| 2011/0221320 A1* | 9/2011 | Petrick ................. G06F 1/1626 312/327 |
| 2011/0264927 A1 | 10/2011 | Dearborn et al. |
| 2011/0309591 A1* | 12/2011 | Petrick ................ H01R 13/465 280/47.35 |
| 2012/0198119 A1* | 8/2012 | Johnson ............. G06F 13/4022 710/312 |
| 2013/0262708 A1 | 10/2013 | McLeod |
| 2014/0239883 A1 | 8/2014 | Hobson et al. |

OTHER PUBLICATIONS

Digi, *Anywhere USB Network-Attached USB Hub*, product literature DIGI International, Inc., unknown publication date (3 pages).

* cited by examiner

REMOTE MONITORING SYSTEM FOR HANDHELD ELECTRONIC DEVICES

CROSS-REFERENCE TO RELATED APPLICATIONS

This application is a continuation of U.S. patent application Ser. No. 14/612,566, filed Feb. 3, 2015, which claims priority to U.S. Provisional Application Ser. No. 61/935,653, filed Feb. 4, 2014, the content of each of which is hereby incorporated herein by reference.

BACKGROUND

This disclosure relates to a remote monitoring system for handheld electronic devices.

SUMMARY

All examples and features mentioned below can be combined in any technically possible way.

In one aspect, a remote monitoring system for handheld electronic devices includes a multi-port hub, and a port visualizer connected to one of the ports of the multi-port hub. The port visualizer is configured to provide a host with mapping information correlating USB hub ports with physical storage bays within the storage system. A USB controller monitors the charge status of the ports and reports the charge status information both locally and to a HED status application. The port visualizer obtains device status information from the host and reports device status information to the HED status application. A client application obtains charge status information and device status information from the HED status application to enable remote monitoring of devices connected to the storage system.

In another aspect, a storage system for maintaining handheld electronic devices, includes a multi-port hub and a port visualizer connected to one of the ports of the multi-port hub, the port visualizer being configured to provide mapping information between ports of the multi-port hub and physical storage areas within the storage system to a host connected to the multi-port hub.

In some implementations, the mapping information enables handheld electronic devices connected to the multi-port hub to be correlated by the host with the physical storage areas within the storage system.

In certain implementations, the port visualizer is configured to receive device status information from the host.

In some implementations, the device status information comprises information about synchronizing actions taken by the host on the devices connected within the storage system.

In certain implementations, the device status information further comprises an indication of an amount of time the actions will take to complete.

In some implementations, the storage system further includes a communication controller, in communication with the port visualizer, to forward device status information on a communication network to allow the device status information to be viewable at a remote location.

In certain implementations, the storage system further includes a hub controller, the hub controller being configured to detect charge status information associated with devices connected to the ports of the multi-port hub on a per-port basis.

In some implementations, the hub controller is further configured to use the charge status information to update status indicators on the storage system, the status indicators being visible from outside the storage system and showing the charge status of the devices connected to the ports of the multi-port hub on a per-port basis.

In certain implementations, the communication controller is in communication with the hub controller and is further configured to forward charge status information on the communication network to allow the charge status information to be viewable at a remote location.

In some implementations, the multi-port hub is a multi-port USB hub.

In certain implementations, the port visualizer is configured to use a Human Interface Device (HID) protocol to provide the mapping information to the host.

In another aspect, a handheld electronic device status application configured to receive device status information and charge status information from storage systems and make the device status information and charge status information available to client applications.

In certain implementations, the device status information is information from a host identifying actions taken by the host on devices stored in a storage system.

In some implementations, the charge status information is charge status information provided by a storage system about devices connected to ports within the storage system.

In another aspect, a storage system, includes a data plane interconnecting a host and a plurality of handheld electronic devices, the host being configured to use the data plane to perform synchronization operations on the handheld electronic devices, a status plane configured to obtain charge status information from ports connecting to the handheld electronic devices and to obtain device status information from the host, and a communication system to convey the charge status information and device status information remotely on a network. In this aspect, the communication system enables device status information to be viewed remotely but does not enable synchronization operations on the handheld electronic devices to be controlled remotely.

In some implementations, the status plane comprises a port visualizer to provide separation between the data plane and status plane.

In certain implementations, the port visualizer collects the device status information and forwards the device status information to the communication system.

In some implementations, the status plane comprises a hub controller configured to detect the charge status information of the devices and forward the charge status information to the communication system.

DETAILED DESCRIPTION

Figure 1:
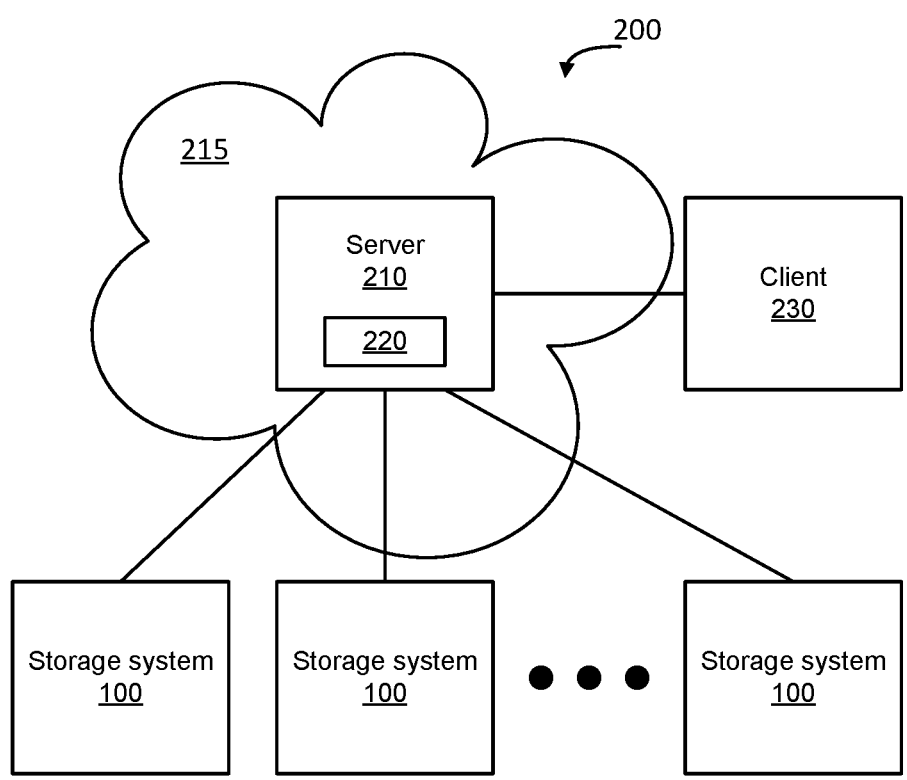
FIG. 1 is a functional block diagram of an example handheld electronic device remote monitoring system.

This disclosure is based, at least in part, on the realization that it is desirable to be able to identify where handheld electronic devices are stored within a storage system and to provide status information about the handheld electronic devices while stored within the storage system.

Portable handheld electronic devices that are capable of storing and interacting with content such as music, video, and applications have recently become popular. Handheld electronic devices will be referred to herein both as handheld electronic devices and "devices", and these two terms therefore should be considered to have the same meaning. For example, devices such as the iPod™, iPad™, iPad Mini™, MacBook™, and MacBook Air™ are popular devices sold by Apple™ Inc., and are example types of handheld electronic devices that can be used to interact with digital content and run applications. Other types of handheld electronic devices are likewise available from other manufacturers, such as Samsung, ACER, Microsoft, Google, Dell, etc., and although an implementation may be described at times in connection with handheld electronic devices available from Apple™, the invention is not limited to use with handheld electronic devices from any particular manufacturer. The term handheld electronic device, as used herein, is generic to include devices such as smartphones, tablet computers, laptop computers, and other electronic devices that may be used to interact with content, run applications, and otherwise communicate and/or interact with other devices on a network.

Groups of handheld electronic devices are often maintained together to enable these devices to be provided, for example in connection with education, training, or in a situation where synchronized content is desirable. For example, a museum may maintain a group of handheld electronic devices loaded with content relevant to a display in the museum. Likewise schools may maintain groups of handheld electronic devices for use by students. Accordingly, systems for maintaining large numbers of handheld electronic devices have been developed. Systems of this nature include computer carts, drawers, desktop open and closable trays, wall cabinets, table cabinets, lockers, and other physical structures that are designed to hold multiple handheld electronic devices. For example, a computer cart may hold 20 handheld electronic devices per shelf, or may include one or more drawers each of which is configured to hold/store 20 or more handheld electronic devices.

Storage systems of this nature often include a multiport USB hub or other type of computer network hub that can connect a group of handheld electronic devices within a storage system to a computer to enable the handheld electronic devices to be charged while stored in the storage system and synchronized with the host computer. In operation, the multiport hub is connected to a host running a synchronization program such as Apple Configurator to cause content stored on the host to be synchronized to the set of handheld electronic devices. Although an embodiment will be described herein in which the synchronization software is Apple Configurator and the handheld electronic devices are iOS based devices, the invention is not limited in this regard as other types of synchronization software may be used and other types of handheld electronic devices may likewise be used.

The physical storage bays within the storage system typically have a numbering system or other identification system. This numbering system allows the storage bay within the storage system, e.g. a particular storage slot within a computer cart, to be identified. The configuration program running on the host, likewise, will have a name associated with each of the handheld electronic devices connected to the multiport USB hub. Thus, for example, it is possible to look at the display associated with the host and determine the state of a particular handheld electronic device attached to the multiport USB hub.

A problem, however, is that the host is not able to correlate a particular handheld electronic device/USB hub port with a particular physical storage bay within the storage system. For example, a user could look at the user interface associated with the port visualizer program and determine that device MUSEUM-12 has completed synchronization. The user might also know that device MUSEUM-12 is often kept in storage bay #12 within the storage system. However, if the device MUSEUM-12 has been returned to the storage system and put in the wrong storage bay, the host conventionally has not able to tell the user which storage bay contains device MUSEUM-12 within the storage system. Additionally, since the handheld electronic device status is only available at the host, it is difficult to determine the status of handheld electronic devices without looking at the host display. Where a number of storage systems are to be monitored by a given individual, this requires the individual to physically access each storage system. For example, in a school with a storage system in each classroom, the person monitoring the storage systems would need to go from classroom to classroom to determine the status of the devices stored in each of the storage systems.

FIG. 1 is a high level functional block diagram of an example remote monitoring system for handheld electronic devices. As shown in FIG. 1, a remote monitoring system 200 includes one or more storage systems 100 configured to report handheld electronic device charge status information and device status information to a server 210. Each storage system 100 that is part of the remote monitoring system periodically transmits charge status information and device status information to the server. In one implementation, the server is remotely located and the storage systems 100 transmit the charge status information and device status information over a network 215 such as the Internet to a handheld electronic device status application 220 running on a network based server 210. Communication of information between the storage system 100 and the server 210 may be secured using a common encryption protocol such as IP-SEC.

The handheld electronic device status application 220 uses the charge status information and device status information to maintain up-to-date status information of each of the handheld electronic devices connected within one of the associated storage systems 100. Client 230 accesses the status information to enable the handheld electronic device status to be viewed at a remote location. In one embodiment, the client 230 is implemented as an application designed to run on a smart phone, tablet, or other handheld electronic device. Communication of information between the server 210 and client 230 may be secured using a common encryption protocol such as IP-SEC.

The client 230 can also be used to pass instructions back to storage system 100 to enable the user to take action on the storage system from a remote location. Multiple actions may be implemented by via the client. Example actions that may be executed through interaction between the user and the client may include:

Query USB hub for charging status on all devices.
Query USB hub for status of Wi-Fi connection, and connected host computer.
Query storage system/USB hub for Apple Configurator specifics
Link a storage system/USB hub to a user
Set name, location and type information for storage system/USB hub
Login and enroll/add users to a storage system/USB hub
Add search tags to a storage system/USB hub, perform searches on names or tags.
Turn on Energy Saving for a storage system/USB hub (tells storage system to only charge during specific hours)
Choose whether or not to receive reports from storage system/USB hub
Set notifications on or off for things like:
  Device fully charged
  Device removed
  Storage system offline
  Synchronization software (e.g. Apple Configurator) actions complete This list is illustrative. The particular actions enabled via the remote monitoring system will depend on the particular implementation.

As shown in FIG. 1, multiple storage systems 100 may communicate with HED status application 220 enabling the client 230 to monitor the status of devices stored in multiple storage systems. Having this status information aggregated in the remote monitoring system enables a user to monitor handheld electronic devices located within a set of geographically dispersed storage systems. For example, in a large school system, each of potentially hundreds of rooms may have one or more storage systems. When the devices need to be updated, having the ability to monitor devices stored within the storage systems enables a person to know when the device updates are completed without physically interacting with the storage system. Likewise, the person can take actions on the storage systems without being required to visit each location with a storage system.

Figure 2:
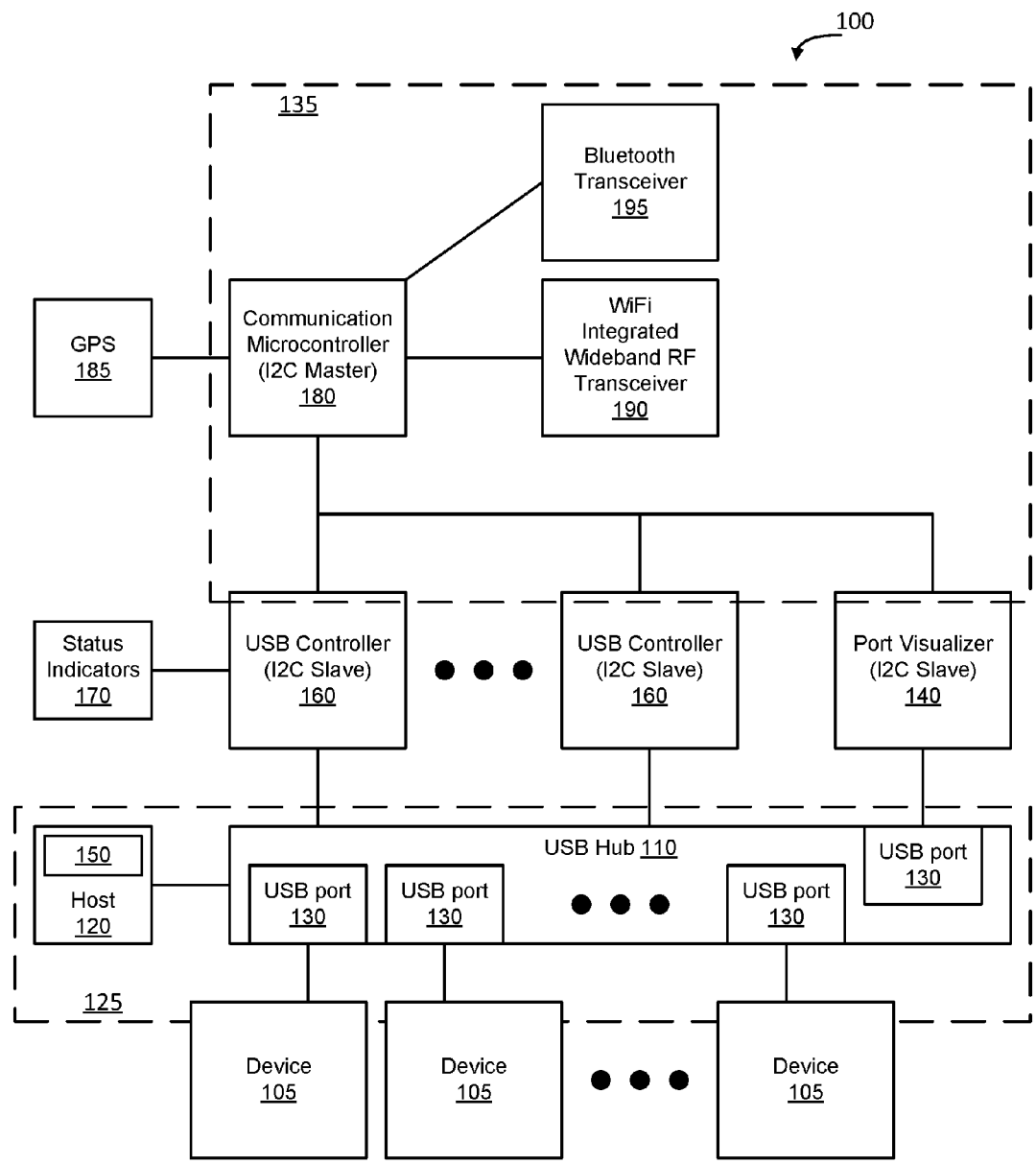
FIG. 2 is a functional block diagram of an example handheld electronic device storage system.

FIG. 2 shows an example storage system 100 according to an implementation. As shown in FIG. 2, the storage system includes a multi-port USB hub 110 that is connected to a host 120. USB controllers 160 manage the ports of the USB hub 110, for example to switch power levels during synchronizing and non-synchronizing states per the USB protocol. USB power controller and monitor chip 115 on each port (see FIG. 4) reports the state of the port 130 to USB controller 160. In one implementation each USB controller 160 is responsible for 10 of the USB ports 130. USB controller 160 activates status indicators 170 on the storage system 100 based on the charge status information received from monitor chip 115, to enable the charge states of the handheld electronic devices to be visible on storage system 100. Charge status information updates are also communicated remotely via communication controller 180 to enable the status of the ports to be monitored at client 230.

Example charge status information includes information about whether a device is connected to a particular port, whether the device is charging, and whether the device is fully charged. Different colored lights may be used as status indicators 170 to show the status of the devices. For example, an orange light may be illuminated if a device is connected and charging, and a green light may be illuminated if a device is connected and fully charged. Other light colors may of course be used depending on the implementation. Alternatively, a touch-sensitive display screen may be provided on the storage system to show a user an interface similar to the user interface described below in connection with FIGS. 6-8.

One of the ports 130 of multiport USB hub 110 is connected to a port visualizer 140. Synchronization software 150 on host 120 communicates with port visualizer 140 to obtain correspondence information between USB port and physical storage bay. Having this correspondence map enables the synchronization software to visually correlate device status information with the corresponding port on a host display. The mapping information is also communicated to the microcontroller to be reported to handheld electronic device status application 220.

Logically, there are two separate paths within the storage system. Host 120 communicates with devices 105 over a logical data path 125. Host 120 uses the data path to communicate with the devices 105, such as to install software, synchronize data, install and remove applications from the devices, etc. Host 120 uses data path 125 to perform any operations the synchronization software 150 on host 120 is normally allowed to implement on devices connected to host 120 over a USB hub.

The storage system 100 also includes a status path 135 which allows charge status information and device status information to be shown locally via status indicators and to be reported to handheld electronic device status application 220. The status path allows operations to be taken on the storage system, such as to initiate charging of devices stored within the storage system, but does not allow data operations to be initiated. For example, an operator using client 230 cannot cause the host to perform a particular operation on one of the handheld electronic devices. Maintaining the status path separate from the data path provides security to the devices stored within the storage system by preventing people using client 230 from taking particular actions on devices connected to the storage system. In particular, the client 230 is not able to take actions on the devices that involve manipulation of applications or data on the devices. Since actions cannot be taken on a device 105 via client 230k, a security lapse at client 230 or at HED status application 220 will not jeopardize the data and applications resident on devices 105 or host 120.

Figure 3:
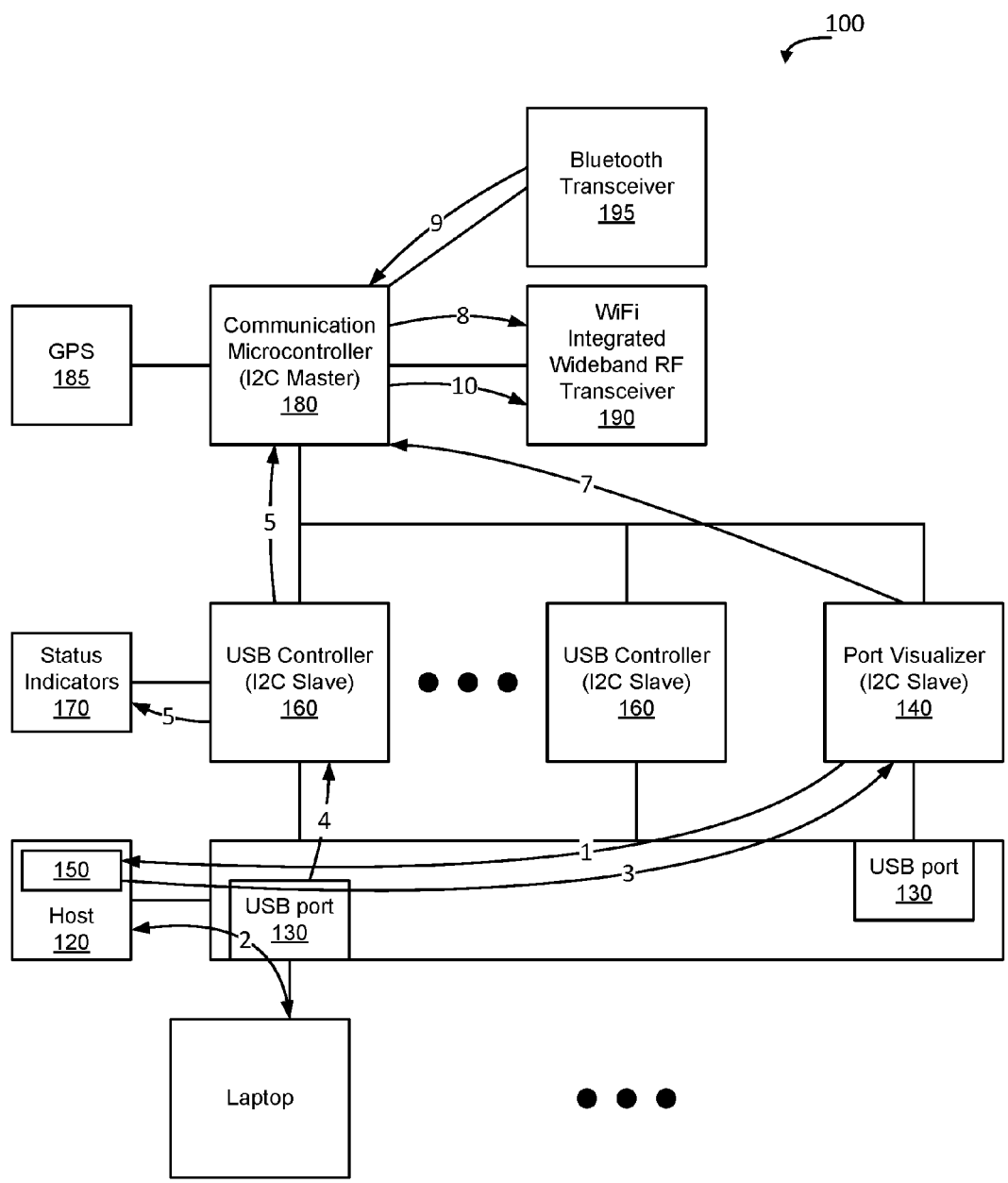
FIG. 3 is a functional block diagram of an example handheld electronic device storage system showing the flow of information between components of the example handheld electronic device storage system.

FIG. 3 shows the flow of information within an example storage system to illustrate the separation between the data path 125 and status path 135. As shown in FIG. 3, port visualizer 140 provides a mapping (arrow 1) between USB port 130 and the physical location associated with the USB port in the storage system. For example, in a storage system with 20 storage bays, the mapping correlates each of the 20 USB ports 130 with a particular storage bay within the storage system.

Host 120 communicates (arrow 2) with devices 105 connected to particular USB ports 130 to change the state of the devices 105. For example, as noted above, synchronization software 150 on host 120 can interact with devices 105 to install applications on the devices 105, etc.

Device status information is also passed from synchronization software 150 on host 120 to port visualizer 140 (arrow 3). The device status information may be obtained by port visualizer 140 by having port visualizer 140 listen on USB hub for messages from synchronization software 150. Alternatively, the synchronization software 150 may communicate status information directly to port visualizer 140, e.g.

via a SET message, whenever a device status is updated or on a fixed schedule. The type of status information may include the activity being performed on the device and an indication of how long it will take for the activity to be completed.

Figure 4:
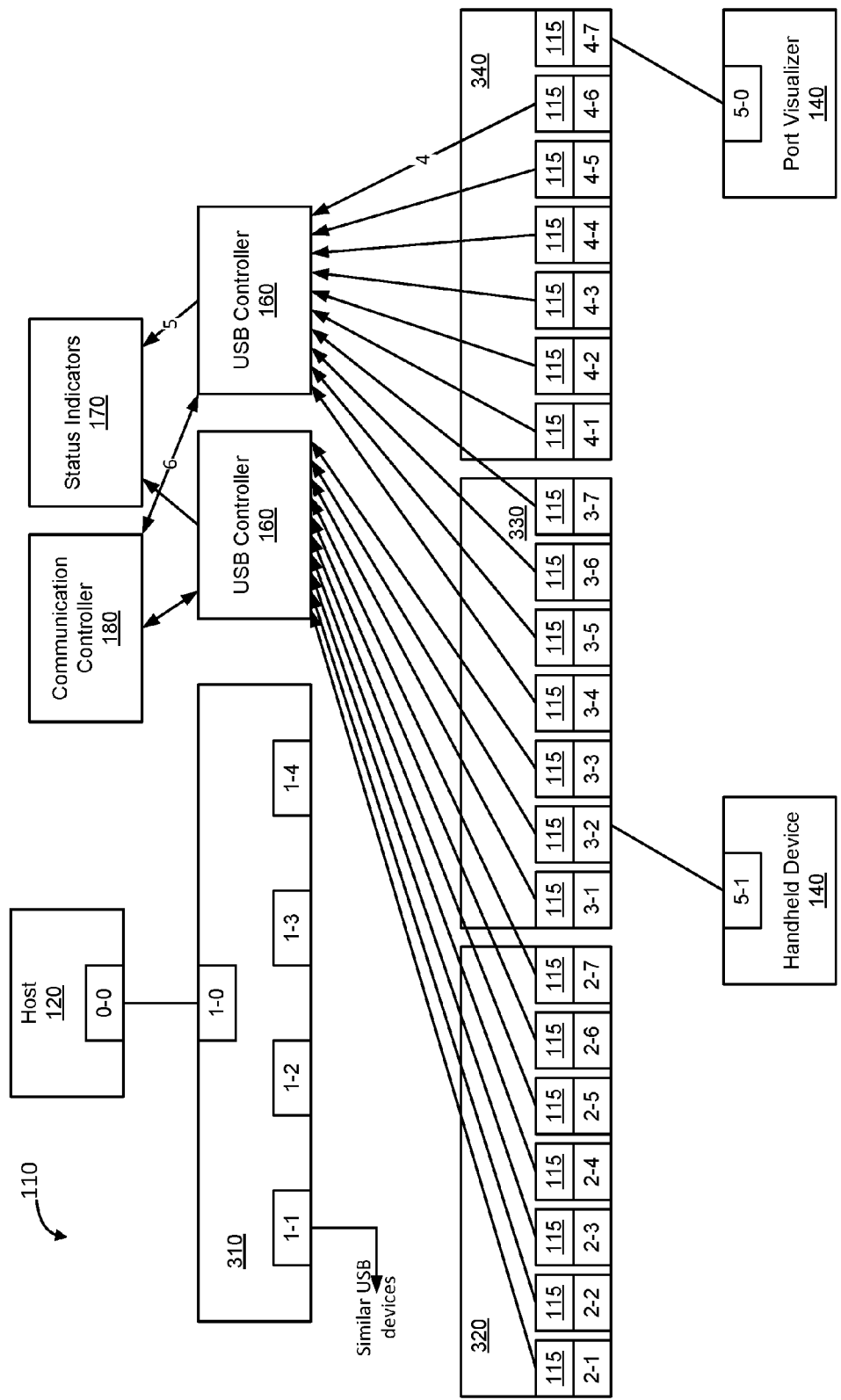
FIG. 4 is a functional block diagram of an example handheld electronic device storage system showing the flow of charge status information between components of the example handheld electronic device storage system.

Charge status information (arrow 4), such as whether a device is physically connected to a port, whether the device is charging, and whether the device is fully charged, is collected by USB controller 160 from USB power controller and monitor chip 115 (see FIG. 4). The charge status information is used locally (arrow 5) to update charge status indicators that are visible on the storage system. This allows a person proximate the storage system to determine the status of the devices stored within the storage system. The charge status information (arrow 6) is also communicated to communication controller 180 to be forwarded to HED status application 220.

Port visualizer 140 conveys device status information received from synchronization software 150 to communication controller 180 (arrow 7). Communication controller 180 transmits both the charge status information and device status information (arrow 8) via a transmitter such as a wireless transmitter 190 over network 215 to HED status application 220. Client 230 can thus access both charge status information and device status information from a remote location to monitor the charge state and device state of handheld electronic devices stored within the storage system 100.

Bluetooth transceiver 195 receives charge status information and optionally device status information from other paired storage systems (arrow 9). The communication controller 180 relays this charge status information and device status information from the other paired storage systems to HED status application 220 (arrow 10). In a situation where multiple storage systems are proximate to each other, such as in a classroom, one of the storage systems will assume the role of master and the other storage systems will assume the role of slaves. The storage systems will pair with each other via their respective Bluetooth transceivers 195 and the communication controller 180 of the master storage system will receive charge status information and device status information from the paired slave storage systems and relay this information to the HED status application 220. By using Bluetooth pairing it is therefore not necessary to have multiple storage systems physically connected to implement monitoring of all the devices stored in the set of storage systems.

In one implementation only charge status information is conveyed via the Bluetooth pairing. In this implementation, if device status is to be conveyed between storage systems for reporting by the master storage system, a physical connection such as a USB cable is required to interconnect the storage systems. A physical connection of this nature may be necessary in an implementation where only a single port visualizer is being used to detect the device status information from the several separate storage systems.

FIG. 4 shows additional detail about how charge status information is collected from the USB ports. As shown in FIG. 4, each USB controller 160 in this implementation is configured to monitor the charge status of ten of the USB ports 130. Specifically, each USB controller 160 receives charge status information about the state of the USB ports 130 from a USB power controller and monitor chip 115 associated with the port. This information is passed to communication controller 180 (arrow 6) and is used to update status indicators 170 (arrow 5).

In the reverse direction, instructions from the HED status application 220 are conveyed to communication controller 180 which are then provided to USB controllers 160. This allows the client 230 to provide instructions regarding actions to be taken on the USB ports, such as to initiate charging of some or all devices, delay charging until a later point in time. Since the USB controllers 160 control power to the USB ports, the USB controllers are able to implement these actions on the USB ports. However, since the USB controller does not have the ability to affect the actions taken by the host, the USB controller 160 is not able to affect the data path instructions to thereby isolate the data path from the HED status application 220.

Figure 5:
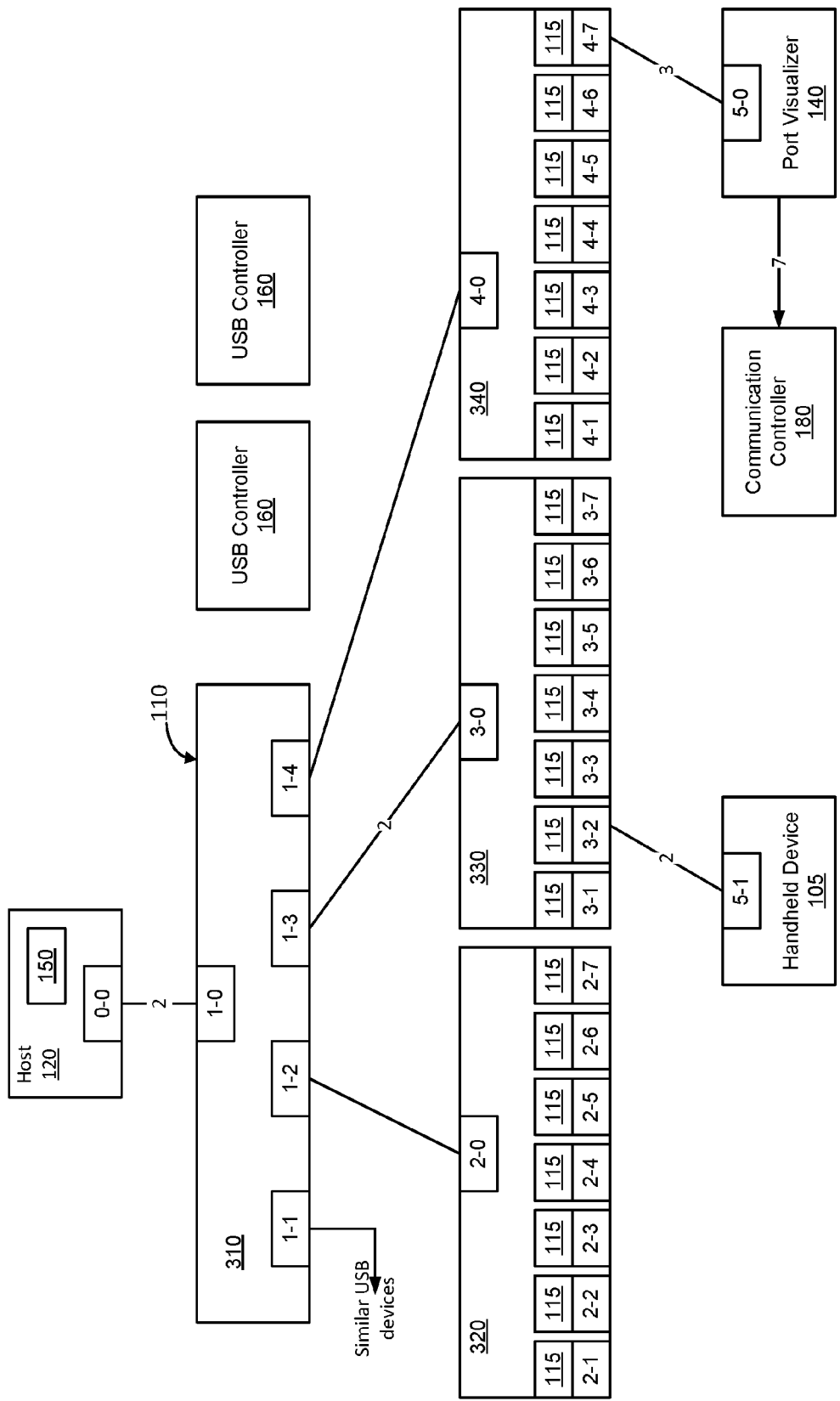
FIG. 5 is a functional block diagram of an example handheld electronic device storage system showing the flow of device status information between components of the example handheld electronic device storage system.

FIG. 5 shows the flow of device status information within the storage system. As shown in FIG. 5, synchronization software 150 on the host 120 interacts with devices connected to ports 130 and, as actions are implemented on the devices 105, the device status information is collected by or transmitted to port visualizer 140 (arrow 3). Port visualizer 140 forwards this device status information (arrow 7) to communication controller 180.

As shown in FIG. 5, the USB hub has a USB port 4-7 which is not visible to a user of the storage system and which is connected to a port visualizer 140. In an embodiment, port visualizer 140 is implemented by a microprocessor containing control logic which configures the microprocessor to interact with software 150 on host 120. As described in greater detail herein, the port visualizer 140 enables the status of the handheld electronic devices connected to the other ports of USB hub 110 to be visualized via status indicators on the storage system itself as well as remotely over a network.

In one embodiment, port visualizer 140 uses the Human Interface Device (HID) protocol to talk with host 120. The use of the HID protocol enables the host to recognize the port visualizer as a USB device and communicate with the port visualizer as a normal USB device. An additional communication protocol is used to enable the port visualizer and the synchronization software 150 to exchange content, so that the port visualizer can provide the synchronization software 150 with information about the configuration of hub 110 and to enable the port visualizer to receive status updates about the handheld electronic devices connected to the multi-port hub.

Port visualizer 140, in one embodiment, has a registered USB hub ID which enables the host 120 to recognize port visualizer as a USB device and communicate with the port visualizer via the USB protocol. Software 150 on host 120 is configured to pass codes to port visualizer 140 identifying status events of handheld electronic devices connected to the ports of USB hub 110. Port visualizer 140 provides a mapping between USB port and physical storage bay to enable the software 150 to correlate which storage bays are used to store particular handheld electronic devices within the storage system.

The port visualizer, in one embodiment, provides information about which handheld electronic device is connected to which physical storage bay to the software 150 to enable the software to include storage bay information to the user via a host display. Thus, in addition to showing the charging state of the handheld electronic devices, the user is also able to determine from the host display where each of the handheld electronic devices are connected. Thus, for example, since the software has a mapping between USB port and physical storage bay, if the software 150 sees handheld electronic device MUSEUM12 connected to a USB port associated with storage bay 14, the synchronization software is able to show on its display that handheld electronic device MUSEUM12 is physically located in storage bay 14 within the storage system. Optimally, the storage bay would have a number identifying it as storage bay 14 to enable the user to readily determine the corresponding physical storage bay.

In one embodiment, the mapping is provided during the recognition process, when the host 120 first recognizes configurator 140. The mapping may also occur later after the recognition process. Communication of mapping information from the port visualizer to the synchronization software 150 occurs using a content synchronization protocol configured to enable the port visualizer and synchronization software to exchange information.

FIG. 3 shows an example 20 port USB hub 110. In the embodiment shown in FIG. 3, a four port hub 310 has an input port 1-0 and four output ports 1-1 through 1-4. Output port 1-1 is reserved for connecting the USB hub 110 to other similar USB hubs. Where multiple hubs are chained together, individual port visualizers on each of the chained hubs provide the functionality described herein for the respective hubs. Optionally, the set of interconnected hubs may share a common network access components, such as by enabling all communication for a given set of interconnected hubs to use a designated communication microcontroller 180 and WIFI access point 190. Communication between the interconnected hubs may be via Bluetooth or physical connection.

Ports 1-2, 1-3, and 1-4 are each connected to a respective second tier USB hub. In the illustrated example, each of the second tier USB hubs has one input port and seven output ports. Specifically, port 1-2 on hub 310 is connected to input port 2-0 on hub 320. Hub 320 has seven user ports 2-1 through 2-7. Port 1-3 on hub 310 is connected to input port 3-0 on hub 330. Hub 330 has seven user ports 3-1 through 3-7. Port 1-4 on hub 310 is connected to input port 4-0 on hub 340. Hub 340 has six user ports 4-1 through 4-6 and hidden port 4-7. Collectively, ports 2-1 through 2-7, 3-1 through 3-7, and 4-1 through 4-6 are user-accessible ports which enable USB hub 110 to have 20 available ports for connecting to handheld electronic devices.

Port 4-7 is a hidden USB port that is not accessible to a user of the storage system. Port 4-7 in the illustrated example is connected to port visualizer 140. Port visualizer 140 is illustrated as having USB port 5-0, which may be implemented as a USB client configured to communicate via the USB protocol and enable the port visualizer to appear as a HID device to host 120. Currently 4 port and 7 port USB hubs are relatively common electrical components enabling this hierarchical structure of USB hubs 310, 320, 330, 340 to be cost effectively implemented. As technology evolves and higher port density USB hubs become available, it may be possible to replace the hierarchical hub architecture with a flat architecture in which a single 20 or 24 port hub is used.

In one embodiment, the port visualizer 140 is a vendor specific HID device that is configured to support GET and SET reports for exchanging data with Apple Configurator running on the host 120. In this implementation, Apple Configurator is utilized as synchronization software 150. The port visualizer uses the GET and SET reports to communicate with the synchronization software. The synchronization software 150 can obtain information from the port visualizer through the use of GET commands. An example GET command may be to obtain a port mapping list from the port visualizer. The synchronization software 150 uses the SET commands to provide information to the port visualizer. For example, the synchronization software 150 may use a SET command to provide the port visualizer with port status updates. In an embodiment, a port status update may include the port number, the type of task occurring on the port, and the amount of time the task will take. For example, the port visualizer may receive a command identifying port 2-3, indicating that a synchronizing operation is occurring at that port, and that synchronization is expected to take 4 minutes.

The port visualizer can also provide information to the synchronization software 150. For example, the port visualizer can provide the software 150 with a port number mapping list correlating ports on the individual hubs (e.g. ports 2-1 through 2-7 on hub 320, ports 3-1 through 3-7 on hub 330, and port 4-1 through 4-6 on hub 340) with physical storage bays within the storage system. Table I shows an example mapping:

TABLE I

| USB Hub Port | Physical storage bay number |
|---|---|
| 2-5 | 1 |
| 2-4 | 2 |
| 2-3 | 3 |
| 2-2 | 4 |
| 2-1 | 5 |
| 2-7 | 6 |
| 2-6 | 7 |
| 3-5 | 8 |
| 3-4 | 9 |
| 3-3 | 10 |
| 3-2 | 11 |
| 3-1 | 12 |
| 3-7 | 13 |
| 3-6 | 14 |
| 4-5 | 15 |
| 4-4 | 16 |
| 4-3 | 17 |
| 4-2 | 18 |
| 4-1 | 19 |
| 4-6 | 20 |

In an implementation, this mapping may be provided using a string containing an ordered list in which each USB hub/port is identified in order to enable the synchronization software 150 to identify each port associated with the set of 20 physical storage slots. An example string for the listing shown in Table I might be:

| | | | | | | | | | | | | | |
|---|---|---|---|---|---|---|---|---|---|---|---|---|---|
| 0x02 | 0x05 | 0x02 | 0x04 | 0x02 | 0x03 | 0x02 | 0x02 | 0x02 | 0x01 | 0x02 | 0x07 | 0x02 | 0x06 |
| 0x03 | 0x05 | 0x03 | 0x04 | 0x03 | 0x03 | 0x03 | 0x02 | 0x03 | 0x01 | 0x03 | 0x07 | 0x03 | 0x06 |
| 0x04 | 0x05 | 0x04 | 0x04 | 0x04 | 0x03 | 0x04 | 0x02 | 0x04 | 0x01 | 0x04 | 0x06 | | |

In this string, the first byte of each entry identifies the USB hub number (see FIG. 5) and the second byte identifies the port on that hub. So 0x02 0x05 identifies USB hub 2 (320 in FIG. 5) USB port 5 (port 2-5 in FIG. 5). By transmitting an ordered list, the host 120 can correlate individual USB ports with particular storage locations within the storage system.

Providing a mapping enables the host to identify the physical storage bay in the storage system and map the device attached to the hub port to a physical storage bay so that the user knows which storage bay within the storage system holds a particular device identified in client app 220. The mapping may be set in advance for a particular storage system since the location of ports on an electronic circuit board implementing the 20 port USB hub and the relative location of the ports on the circuit board relative to storage bays within the storage system are not likely to change once placement of these components has been determined for a particular implementation of the storage system.

The software 150 communicates with handheld electronic devices connected to USB ports on USB hub 110 in a normal manner to perform operations such as synchronization of content, performing operating system updates, naming devices, installing applications and content, creating device profiles, restoring devices to previous profiles, and otherwise managing the handheld electronic devices. In connection with this, the software 150 passes codes to the port visualizer to update the port visualizer whenever a handheld electronic device changes state to implement one of the above-mentioned options. The port visualizer 140, in turn, activates status indicators 170 such as LEDs to enable the state of the handheld electronic devices to be visible on storage system 100 and communicates the status changes to a communication module to enable the status to be updated on a remote monitoring system.

Enabling the port visualizer to provide information about devices connected to ports of the USB hub 110 facilitates naming of the handheld electronic devices. Often, when a new set of handheld electronic devices is to be deployed in an organization, the handheld electronic devices will be connected to USB ports in a storage system such as the system shown in FIG. 1 and, when connected to host 120, the devices will be named by the host. It is desirable to have the names somewhat correspond to the storage bay in which the device is normally stored. For example, if a set of 20 handheld electronic devices are to be named MUSEUM01-MUSEUM20, it would be desirable from a user's perspective to have device MUSEUM01 stored in storage bay 01, device MUSEUM02 stored in storage bay 02, etc. This does not naturally occur, however, since the host 120 is not able to differentiate which of the USB ports is associated with which of the physical storage areas within the storage system. Because port visualizer 140 has the ability to tell the software which USB port is associated with which physical storage bay, the synchronization software 150 is able to assign names to the devices based on storage bay rather than USB port, which enables the device naming convention to more logically correspond with the physical structure of the storage system 100.

In the example shown in FIG. 1, communication controller 180 is connected to the microcontroller(s) implementing USB controllers 160 and to a microcontroller implementing port visualizer 140 via an i2C serial bus. In the implementation shown the communication controller 180 is the i2C master and each of the microcontrollers 160, 140 is an i2C slave, although this may be adjusted depending on the implementation. Likewise, the particular bus selected to connect the components depends on the particular implementation. The communication controller 180 is connected to one or more transceivers, such as WiFi integrated wideband RF transceiver 190 and/or Bluetooth transceiver 195, to enable communications to be transmitted using one or more wireless communication protocols. Optionally, not shown, the communication controller may also have a physical port such as an Ethernet port to enable the communication controller to provide status information on an Ethernet or other wired communication network.

The communication microcontroller 180 receives handheld electronic device status information from the software 150 relayed by port visualizer 140. This information is passed via transceiver 190 to the server 210 and used by HED status update software 220 to provide an updated status on a user interface that is presented via client 230. In one embodiment software 220 is implemented as a web portal and client 220 is implemented as a web browser that connects to the web portal to obtain information to be displayed to the user. The client 220 processes information received from HED status application 220 and generates a display based on the information and presents the display via a graphical user interface on a client device.

Figure 6:
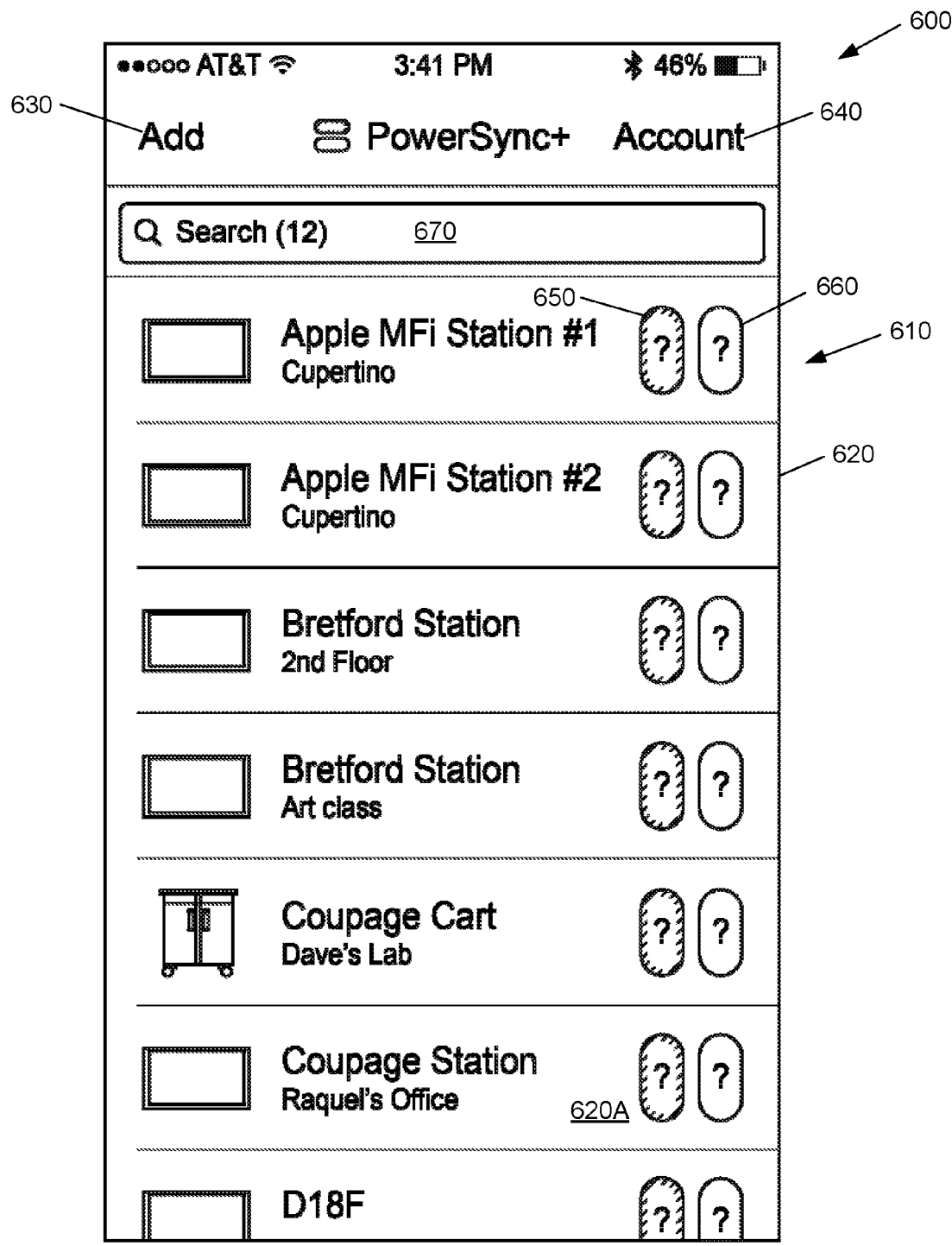
FIGS. 6-8 are screen shots of a user interface of a client application configured to interact with a HED status application to obtain charge status information and device status information to enable remote monitoring of handheld electronic devices stored within the storage system.

FIGS. 6-9 are screen shots of an example user interface of client application 230. FIG. 6 shows a list of storage systems that are available. As shown in FIG. 1, the HED status application 220 receives status updates from multiple storage systems 100. In one implementation, the HED status application enables client 230 to have access to status information from a subset of the monitored storage systems 100. In this implementation, a given instance of the HED status application provides monitoring services to multiple clients. In another implementation, a separate instance of the HED status application is implemented for each client such that the HED status application instance only has information about storage systems that are being monitored by client 230.

As shown in FIG. 6, the user interface of client application 600 has a list 610 of monitored storage systems. Each storage system appears as an item 620 in the list 610. The user interface includes a button 630 to add additional storage systems. The user interface also enables the user to change account settings via button 640. A given user may have multiple accounts and may separate monitored storage systems into groups by associating sets of monitored storage systems into separate accounts. Tags may also be assigned to storage systems to help distinguish storage systems.

Entries 620 in list 610 are provided with a pair of high level status indicators. The first status indicator 650 indicates whether the storage system is available on the network. The second status indicator 660 indicates whether the storage system is charging the handheld devices stored within the storage system. A search bar 670 is provided to enable the list to be searched for a particular storage system.

Figure 7:
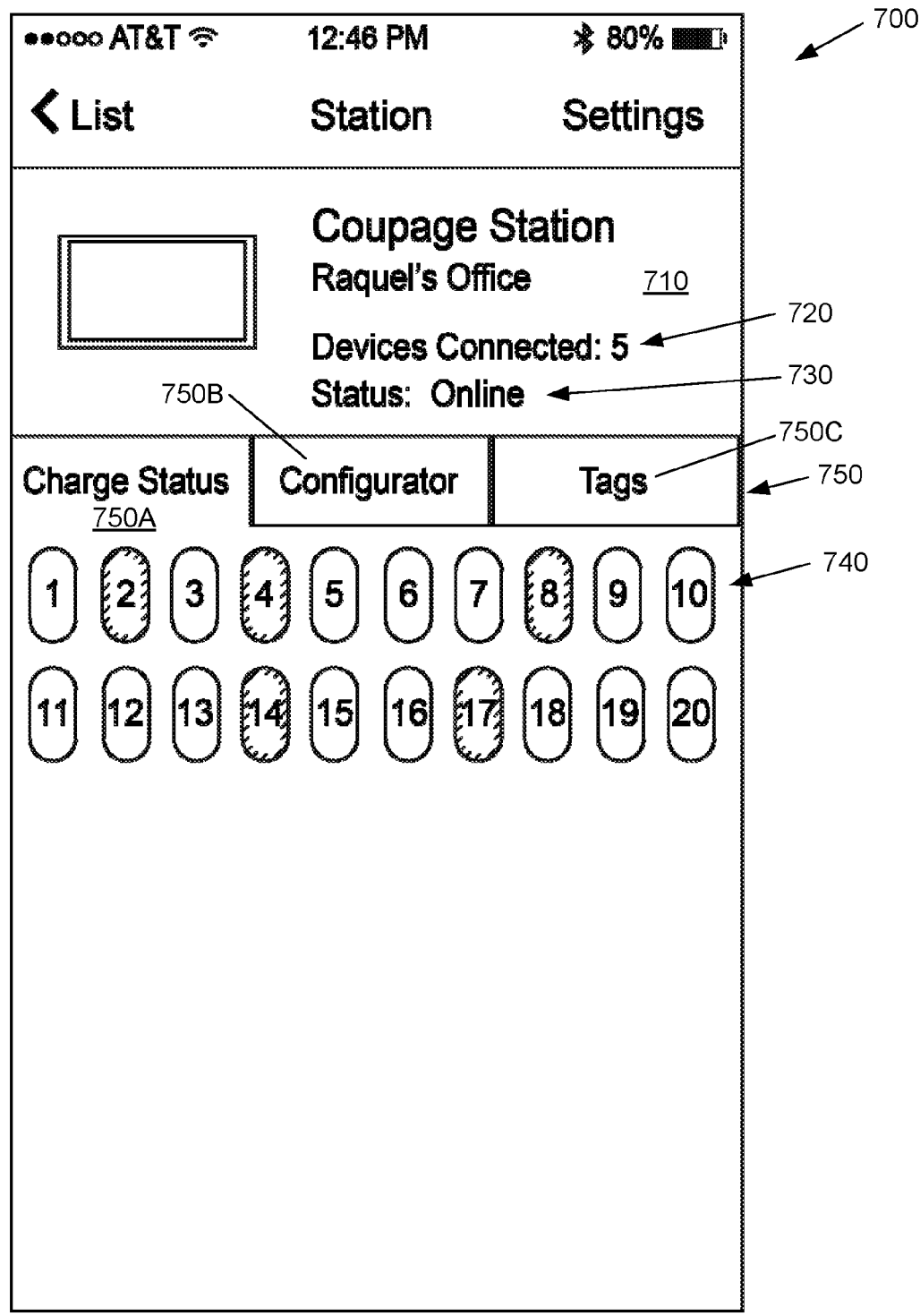

FIG. 7 shows the user interface when one of the entries 620A in list 610 is selected. On a device with a touch sensitive screen, selection of an entry may be implemented by touching the screen on the particular entry.

As shown in FIG. 7, upon selection of an entry a screen 700 containing additional information about the storage system associated with the entry is provided. The top of the screen 710 contains identifying information about the selected storage system. The number of devices 720 connected in the storage system is shown, as is the status of the storage system 730. In the example shown in FIG. 7, there are 5 devices within the storage system and the status of the storage system is "online", meaning that the storage system is in communication with HED status application 220 over the network and is providing status updates.

The user interface also has a set of device status indicators 740 which physically are arranged on the user interface to correspond with the physical placement of storage bays within the storage system. In the implementation shown in FIG. 7, the storage system being monitored has two rows of 10 storage slots. Accordingly, the user interface likewise has two rows of 10 device status indicators 740. The status indicators change color depending on the charge status of the devices. For example, the charge status indicator will be orange/red when the device is charging, and will turn green once the device is fully charged. An empty indicator/white indicator shows that no device is connected to the storage system in a particular storage slot. For example, charge status indicator for slot 1 is empty, indicating that no device is connected in slot 1 in the monitored storage system.

The user interface has tabs 750 that allow the user to select alternative views to show different aspects of information available via HED status application 220. Charge information, described above in connection with FIG. 7, is available via charge status tab 750A. Device status information is available via configurator tab 750B, which is described below in connection with FIG. 8. Tags tab 750C enables a user to add tags to particular storage systems to provide a mechanism for the user to keep track of particular storage systems.

Figure 8:
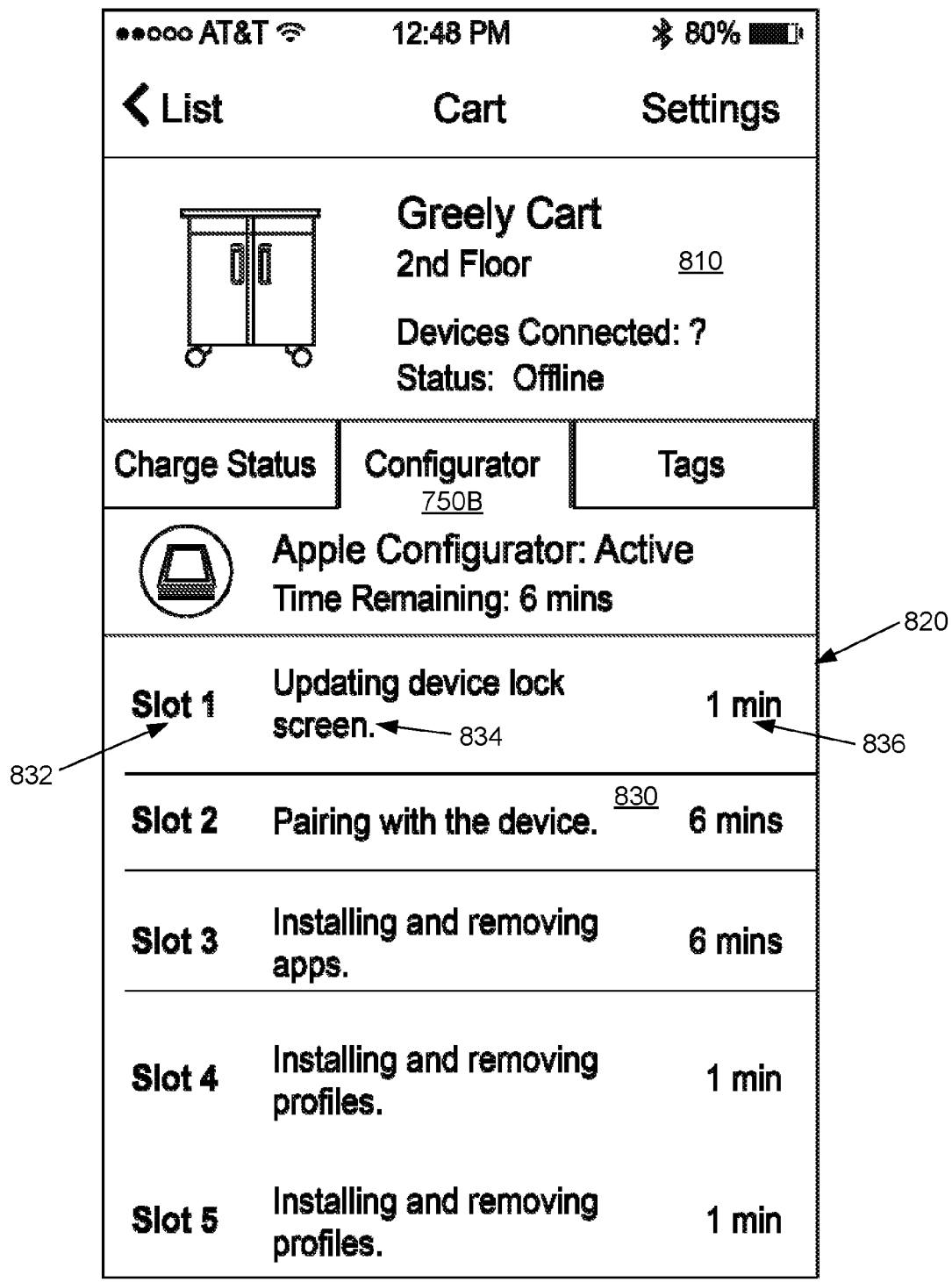

FIG. 8 shows a view of the user interface when a user selects configurator tab 750B. As shown in FIG. 8, the configurator tab allows the user to see the current device status information associated with each device connected within the selected storage system. In FIG. 8, the user interface has a top portion 810 which contains identifying information about the cart. The user interface also has a list 820 of devices stored within the cart. Device status information for each device captured by the port visualizer is provided in each entry 830 of list 820.

Each entry identifies the slot 832 in the storage system where the device is located, the status of the device 834, and the amount of time 836 it will take to complete the activity listed in the device status area. The host communicates with the devices via USB and uses the USB/physical slot mapping information to determine which device is associated with the physical slots in the storage system. This allows the device status information to be listed based on physical slot 832 within the storage system.

The device status information is captured by the port visualizer 140. The particular device status information will depend on the information output by the synchronization application 150 on host 120. Example device status information, shown in FIG. 8, may indicate, for example, that the host is updating the device lock screen (slot 1), that the host is pairing with the device (slot 2), the host is installing and removing applications from the device (slot 3), or that the host is installing and removing profiles at the device (slots 4 and 5). Other example device status information might include:
  device detached
  device attached
  updating the device name
  installing iOS
  restoring device from backup
  installing and removing profiles
  activating the device Each entry 830 in list 820 also includes a time estimate 840 indicating how long the identified activity is expected to take before completion. For example, in FIG. 8 the device status information for slot 1 indicates that the host is currently updating the device lock screen and that the activity is expected to take 1 minute. Providing the time estimate allows the user of client 230 to know how long it will be before the devices are ready to use.

In an implementation, as shown in FIG. 2, the storage system optionally includes a Global Positioning System (GPS) receiver 185 configured to receive GPS signals. Information from the GPS receiver 185 may be reported to HED status application 220 to enable the location of the storage system 100 to be determined via client 230. Where storage systems are mobile, such as is the case with computer carts, this enables the location of the storage system to be determined for example within a school campus. Optionally, where the cart or electronics is used in a device that is intended to be mobile and detached from a source of power, the cart or other mobile device may include a battery or other source of portable power to enable the electronics to be operative when the storage system is not connected to an external source of power.

Having all the status information at a centralized location such as at application 220 provides other opportunities for managing and monitoring the use of the handheld electronic devices. For example, application 220 has information about the operational status of the handheld electronic devices stored in each of the storage systems 100. This information may tracked over time and used to infer usage levels of the handheld electronic devices. For example, in a school setting, one classroom may be using handheld electronic devices often while another classroom may be using the handheld electronic devices less often. This difference in usage levels will be reflected in the status history of the handheld electronic devices of the respective storage systems associated with those classrooms. Thus, it becomes possible to discern how often handheld electronic devices are being used within a school system and identify disparities in usage between similarly situated classrooms. Other data mining activities based on usage patterns may likewise be envisioned. For example, in an environment where only a particular individual such as a particular teacher has access to a particular storage system, use of the handheld electronic devices associated with the particular storage system may be correlated with the particular teacher.

Implementations of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. In addition, the instructions may be implemented in a high-level procedural and/or object-oriented programming language, and/or in assembly/machine language. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other implementations are within the scope of the following claims.

What is claimed is:

1. A storage system for maintaining handheld electronic devices, comprising:

a plurality of physical storage bays to hold a plurality of handheld electronic devices;
a USB hub having a plurality of USB ports;
a plurality of handheld electronic devices disposed in the physical storage bays and connected via USB cables to the plurality of USB ports of the USB hub;
a host computer connected via a USB cable to one port of the USB hub and in communication via the USB hub with the plurality of handheld electronic devices to control device status of the handheld electronic devices;
a hub controller, the hub controller being configured to detect charge status information associated with the handheld electronic devices connected to the ports of the hub on a per-port basis;
a port visualizer connected to one of the ports of the hub, the port visualizer providing mapping information to the host computer correlating individual ports of the hub with identification of corresponding physical storage bays within the storage system where individual ones of the plurality of handheld electronic devices are disposed; and
a communication controller, in communication with the hub controller and the port visualizer, to forward charge status information and device status information on a communication network to enable the charge status information and device status information to be viewable over the communication network at a remote location other than the host, and to enable charging operations of the plurality of handheld devices to be controlled from the remote location over the communication network, but not to enable data or applications on the handheld electronic devices to be accessed from the remote location over the communication network and not to allow device status operations to be controlled from the remote location over the communication network.

2. The storage system of claim 1, wherein the mapping information enables handheld electronic devices connected to the hub to be correlated by the host with the physical storage areas within the storage system.

3. The storage system of claim 1, wherein the port visualizer is configured to receive the device status information about the plurality of handheld electronic devices from the host.

4. The storage system of claim 3, wherein the device status information comprises information about synchronizing actions taken by the host on the plurality of handheld electronic devices connected to the ports of the hub.

5. The storage system of claim 4, wherein the device status information further comprises an indication of an amount of time the synchronization actions will take to complete.

6. The storage system of claim 1, wherein the hub controller is further configured to use the charge status information to update status indicators on the storage system, the status indicators being visible from outside the storage system and showing the charge status of the handheld electronic devices connected to the ports of the hub on a per-port basis.

7. The storage system of claim 1, wherein the port visualizer is configured to use a Human Interface Device (HID) protocol to provide the mapping information to the host.

8. A storage system, comprising:
a hub having a plurality of ports, one of the ports of the hub being configured to be connected to a host computer and other ports of the hub being configured to be respectively connected to a plurality of handheld electronic devices, the hub enabling the host computer to synchronize content to the handheld electronic devices when the handheld electronic devices are connected to the hub;
a hub controller configured to detect charge status information of each handheld electronic devices from the ports of the hub, the charge status information of a given port specifying a charge state of a respective one of the handheld electronic devices when the respective one of the handheld electronic devices is connected to the given port;
a port visualizer connected to one of the ports of the hub to listen on the hub for device status information, the device status information including commands sent from the host computer to handheld electronic devices connected to the ports of the hub specifying actions to be taken by the host computer on the handheld electronic devices connected to the ports of the hub, or the device status information including messages transmitted from the host computer addressed to the port visualizer informing the port visualizer of actions taken by the host computer on the handheld electronic devices connected to the ports of the hub; and
a communication system to convey the charge status information and device status information to a remote location other than the host via a communication network and to enable charging operations of the storage system to be controlled from the remote location over the communication network;
wherein the communication system enables the charge state of the handheld electronic devices to be viewed remotely, enables the device status information to be viewed remotely, and enables the charging state of the control system to be controlled remotely, but does not enable access to data or applications on the handheld electronic devices to be accessed remotely and does not enable messages received from the remote location to be forwarded onto the hub to prevent the remote location from taking actions on the handheld electronic devices connected to the ports of the hub.

9. The storage system of claim 8, wherein the port visualizer forwards the device status information to the communication system.

10. The storage system of claim 8, wherein hub controller forwards the charge status information to the communication system.

11. The storage system of claim 8, wherein the device status information further comprises information about synchronizing actions taken by the host on the plurality of handheld electronic devices connected to the ports of the hub.

12. The storage system of claim 11, wherein the device status information further comprises an indication of an amount of time the synchronization actions will take to complete.

13. The storage system of claim 8, further comprising a plurality of status indicators being visible from outside the storage system and showing the charge status of the handheld electronic devices connected to the ports of the hub on a per-port basis;
wherein the hub controller is further configured to use the charge status information to update the status indicators to show the charge status of the handheld electronic devices.

14. The storage system of claim 8, wherein the hub is a USB hub.

15. The storage system of claim 14, wherein the port visualizer is configured to use a Human Interface Device (HID) protocol to provide the mapping information to the host.

\* \* \* \* \*